US006979073B2

(12) United States Patent
Shrader

(10) Patent No.: US 6,979,073 B2
(45) Date of Patent: Dec. 27, 2005

(54) METHOD AND APPARATUS TO PULL SMALL AMOUNTS OF FLUID FROM N-WELL PLATES

(75) Inventor: Eric J. Shrader, Belmont, CA (US)

(73) Assignee: Xerox Corporation, Stamford, CT (US)

( * ) Notice: Subject to any disclaimer, the term of this patent is extended or adjusted under 35 U.S.C. 154(b) by 168 days.

(21) Appl. No.: 10/322,883

(22) Filed: Dec. 18, 2002

(65) Prior Publication Data

US 2004/0112979 A1 Jun. 17, 2004

(51) Int. Cl.$^{7}$ ........................... B41J 2/135; G01N 1/10
(52) U.S. Cl. ......................... 347/46; 436/180; 422/100
(58) Field of Search .............................. 347/14, 19, 20, 347/21, 44, 46, 48, 54; 436/71, 73, 86, 94, 436/177, 180; 422/99–101

(56) References Cited

U.S. PATENT DOCUMENTS

| | | | | |
|---|---|---|---|---|
| 4,745,419 A | | 5/1988 | Quate et al. | |
| 4,801,953 A | | 1/1989 | Quate | |
| 5,047,215 A | | 9/1991 | Manns | 422/101 |
| 5,565,113 A | * | 10/1996 | Hadimioglu et al. | 216/2 |
| 5,629,724 A | | 5/1997 | Elrod et al. | 347/46 |
| 5,912,679 A | * | 6/1999 | Takayama et al. | 347/10 |
| 6,045,208 A | * | 4/2000 | Hirahara et al. | 347/10 |
| 6,416,164 B1 | | 7/2002 | Stearns et al. | 347/46 |
| 6,503,454 B1 | | 1/2003 | Hadimioglu et al. | 422/100 |
| 6,514,704 B2 | | 2/2003 | Bruce et al. | 435/6 |
| 6,548,308 B2 | | 4/2003 | Ellson et al. | 347/46 |
| 2002/0094582 A1 | * | 7/2002 | Williams et al. | 436/180 |
| 2003/0048341 A1 | | 3/2003 | Mutz et al. | 347/46 |

OTHER PUBLICATIONS

Popoloski, Martin, et al. (Corning Incorporated); "Proposed Standard for SBS Approved 96, 384, & 1536 Well Microplates"; Jan. 22, 2001.
Innovations Magazine, Winter 1999, Product Update, "New 48 and 96 Well FlexChem Reactor® Blocks"; http://www.robscki.com/innovations/iv71/iv71pu.html.

* cited by examiner

*Primary Examiner*—Stephen D. Meier
*Assistant Examiner*—Julian D. Huffman
(74) *Attorney, Agent, or Firm*—Fay, Sharpe, Fagan, Minnich & McKee, LLP

(57) ABSTRACT

A drop transfer system has a plurality of acoustic transducers capable of generating acoustic waves. A plurality of spacing components are located between at least some of the acoustic transducers. A controller is placed in operative connection with the acoustic transducers and configured to activate the acoustic transducers in a phase relationship with each other. The acoustic transducers are positioned in relationship to each other and are operated in the phase relationship to have at least some of the acoustic waves converge at a selected point at a selected time.

12 Claims, 6 Drawing Sheets

METHOD AND APPARATUS TO PULL SMALL AMOUNTS OF FLUID FROM N-WELL PLATES

BACKGROUND OF THE INVENTION

The present invention is directed to fluid movement, and more specifically, to the movement of small drops of fluid through the use of acoustic waves.

A number of applications, such as combinatorial chemistry, high throughput screening, among others, include a procedure for taking small amounts of liquid reagents contained in a well plate, and then depositing the small amounts of reagents in different combinations into other well plates, i.e., a well-plate-to-well-plate transfer. An issue which arises in the transfer of fluids from well plate to well plate is potential contamination of the donor well plate. Particularly, the donor well plate may contain material which is part of a library of donor materials that can number in the millions of compounds and represent a major investment for an institution, corporation or other organization.

Presently, these compounds are often transferred by an exchange apparatus using disposable tips. The exchange apparatus may be a vacuum pipette system, wherein the tip comes into contact with fluids in wells of the donor well plate. Therefore, after each operation the disposable tip is replaced with a new tip, such that the next time the pipette is used, contamination will not occur when the pipette is placed into a different well in the donor well plate.

The need to replace the disposable tip has certain drawbacks, including slowing down the transfer process, and the financial cost of tip replacement. A further drawback is that the reagent maintained in the tip is discarded with the tip. Commonly, the reagent and/or other fluids in the well plates are themselves expensive, and such waste of these materials adds to the economic cost of the transfer.

In order to minimize, and more desirably eliminate, contamination issues, it is considered useful to employ a transfer mechanism or procedure to remove droplets from the donor well plate without physical contact to the fluid.

In U.S. Pat. No. 6,416,164 to Stearns, et al., a transfer mechanism is taught to be eject fluids from a well plate without physical contact, and further to use this transfer mechanism for well-plate-to-well-plate transfer. The '164 patent is hereby incorporated by reference in its entirety. In that patent, an acoustic ejector, including a focusing element and acoustic radiation generator imparts an acoustic wave through the bottom surface of a well to eject droplets from a well plate. It is argued in this patent, that prior devices employed lensing designs which did not permit for the projecting of a focal point far enough into a well to emit acoustic droplets.

More particularly, for example, it was noted that the base of a Greiner 1536 well has an extent of approximately 1.53 mm. The narrowness of this well limits the physical dimension of the acoustic beam which may enter a column of liquid contained within the well, as acoustic beams that are wider than the base of the well would result in unwanted generation of complex pattern of refraction in the well walls. The height of the walls in such a well is 5 mm, more than three times the dimension of the base. Using an F1 lens and maintaining the extent of the acoustic energy within the well base, the depth from which the lens could effect ejection would be substantially under 2 mm. Hence, it was argued the fluid could not be ejected from such a well if the well was more than half full. The patent noted that in contrast, by using a weakly focusing lens such as an F3 lens, the full height of the liquid would be within the range of focus.

Thus, patent is concerned with ejecting droplets from a container having a greater depth than width ratio, when the acoustic waves being used to eject droplets enter the reservoir from the bottom of the reservoir.

It has been determined by the inventors that an alternative method and design for emitting or obtaining drops from a fluid reservoir such as a well plate would be useful, where contamination of the fluid within the well plates is avoided.

BRIEF DESCRIPTION OF THE INVENTION

Accordingly, presented is a drop transfer system having a plurality of acoustic transducers capable of generating acoustic waves. A plurality of spacing components are located between at least some of the acoustic transducers. A controller is placed in operative connection with the acoustic transducers and configured to activate the acoustic transducers in a phase relationship with each other. The acoustic transducers are positioned in relationship to each other and are operated in the phase relationship to have at least some of the acoustic waves converge at a selected point at a selected time.

In another aspect of the invention, a method is provided for transferring drops in an acoustic drop generation system. The steps include positioning a reservoir of fluid in operational association with a plurality of acoustic transducers separated from each other by a plurality of spacing components. Then there is a selective activation of at least some of the acoustic transducers to generate a plurality of acoustic waves with appropriate phase relationships. The generated acoustic waves are directed to a same spot at the same time wherein the energy from these waves may constructively interfere, effectively focusing the waves and emits a drop from the reservoir.

With attention to yet a further aspect of the present invention, provided is a drop transfer system, including a reservoir configured to hold a fluid. A drop ejection mechanism is configured to be placed in operational association with the reservoir, wherein operation of the drop ejection mechanism results in drops of fluid in the reservoir being emitted from the reservoir via an aperture. A controller is provided to control operation of the drop ejection mechanism. A drop collection mechanism having side walls, a first end perpendicular to the side walls, a second end perpendicular to the side walls and distant from the first end, where the first end includes a hydrophobic outer surface in which is defined an opening and a hydrophilic interior section extending from the opening and defined by the side walls.

DETAILED DESCRIPTION OF THE PREFERRED EMBODIMENT

Figure 1A:
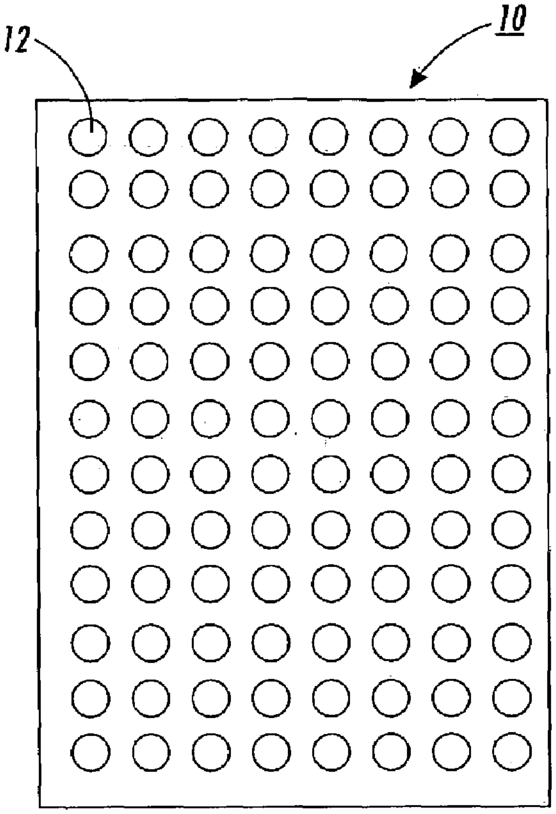
FIG. 1A illustrates a planar view of a well-plate.
Figure 1B:
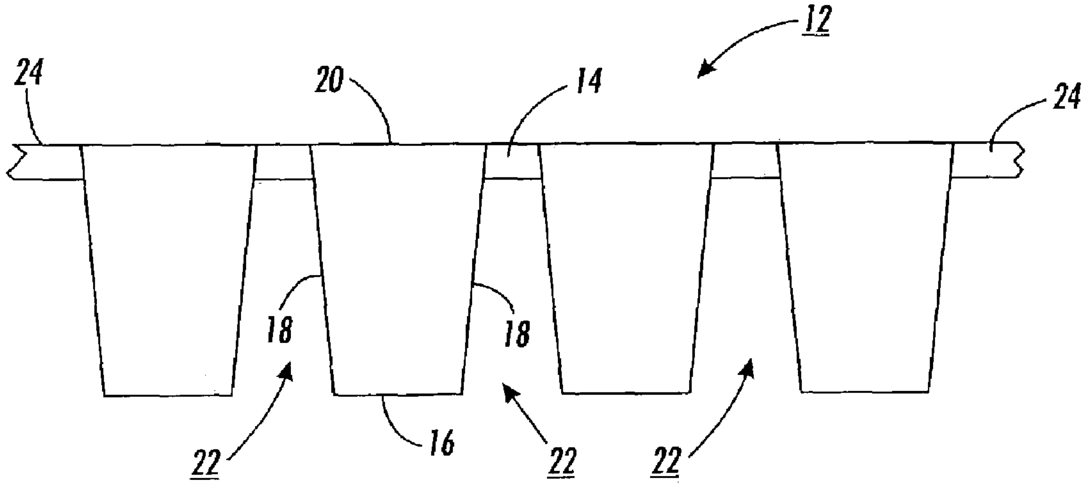
FIG. 1B depicts a portional view of a well plate having individual wells or reservoirs, which may be used in conjunction with the present application.

FIG. 1A is a planar view of a multi-well plate 10 which may be used in connection with concepts of the present application. It is understood that well-plate represents well plates having any number of wells (i.e., reservoirs) 12. FIG. 1B provides a portional cross-sectional view of well plate 10. As shown in the cross-sectional portional view, the plurality of reservoirs 12 are spaced within the well plate. The reservoirs 12 being connected within the overall well plate via an upper interconnection surface 14. In one embodiment, the reservoirs 14 which include a bottom surface 16, side walls 18 and a top aperture 20, are spaced from each other and designed in association with the overall well plate to have unobstructed access to the outer surfaces of side walls 18. Wherein unobstructed access areas 22 are between apertures 20, and also between a reservoir 12 and an end portion 24 of the well plate.

Multi-well plates which may be used in the present application may have any number of wells in any well arrangement, on any multi-well plate format or footprint. Typically, the wells are arranged in two-dimensional linear arrays such as shown in FIG. 1A, and usually have between 96 and 864 wells. However, it is to be appreciated that well plates with a larger number of wells such as 1536, 3456, and 9600, as well as other well plate sizes, may be used.

Well volumes typically vary from 500 nanoliters or less to over 200 microliters, depending on well depth and a cross-sectional area. Wells can be made in any cross-sectional shape (in plan view), including square, round and hexagonal, and combination thereof. Wells can be made in any cross-sectional shape (in vertical view), including shear vertical walls with flat or round bottoms, conical walls with flat or round bottom, and curved vertical walls with flat or round bottoms and combinations thereof.

The materials for manufacturing the well plates are typically polymeric, since these materials lend themselves to mass manufacturing techniques. Polymeric materials can particularly facilitate plate manufacture by molding methods known in the art and developed in the future. One particular type of multi-well plate is a microtiter plate.

It is to be appreciated that, while the well plate described in FIG. 1B, has unobstructed access to the side walls, other embodiments of the present application do not need access to the side-walls, and well plates having bottom support beams or components may also be used.

Figure 2:
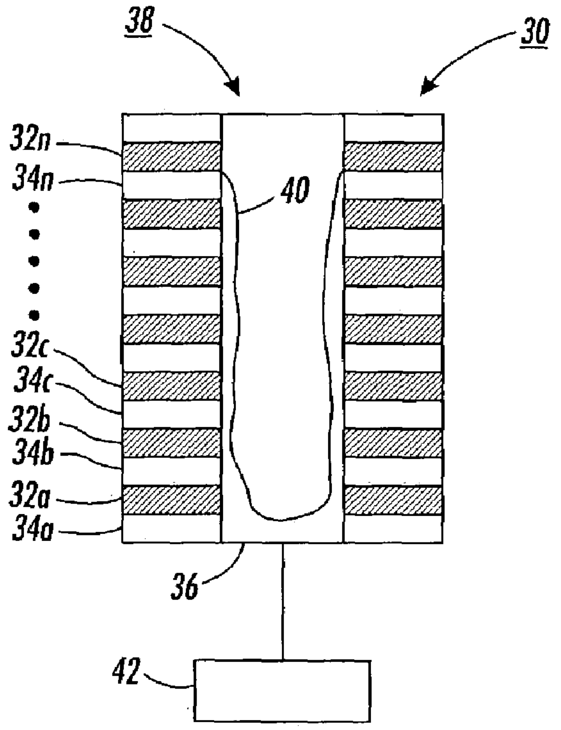
FIG. 2 depicts an embodiment of a stacked acoustic ejection mechanism which is used to eject fluid from the wells.

Turning to FIG. 2, illustrated is a side view of a single stacked acoustic ejection mechanism 30. The ejection mechanism 30 includes a plurality of acoustic transducers 32*a*–32*n* and spacing components 34*a*–34*n* arranged in an alternating sequence stacked design. The spacing components may be made of any material which does not interfere substantially with acoustic waves generated from the transducers 32*a*–32*n*. In one embodiment, the spacing components may be made of a polymeric material. The plurality of transducers 32*a*–32*n* and spacing components 34*a*–34*n* may, alternatively, be built upon a base 36. The position of the transducers 32*a*–32*n* and spacing components 34*a*–34*n* define an interior area 38, sized to receive a well, such as the wells of FIG. 1. Interior area 38 may in certain embodiments include an acoustic coupling material 40, such as water, silicone, or other appropriate material having a sufficiently high acoustic coupling characteristic. A controller 42 is in operational connection to the transducers 32*a*–32*n* to selectively activate the transducers for the generation of acoustic waves.

Figure 3:
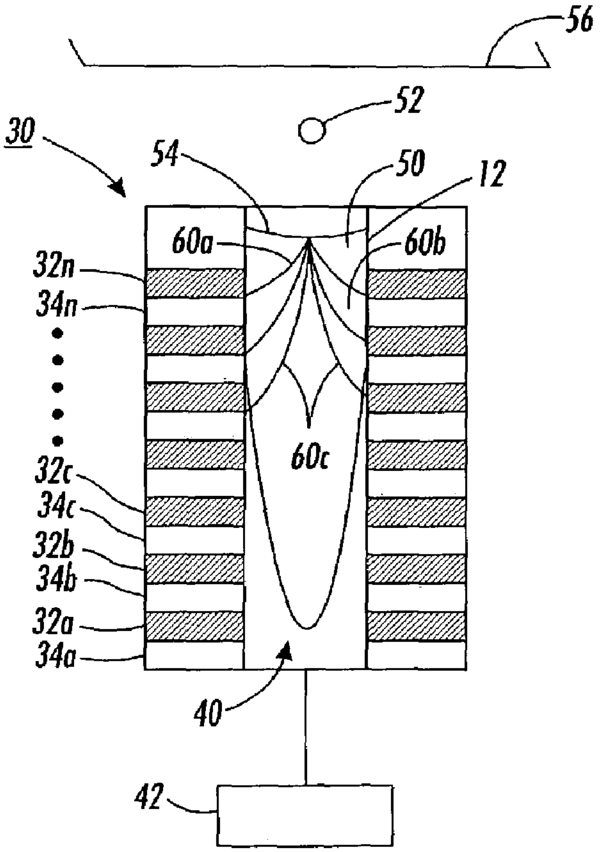
FIG. 3 sets forth a side view of a single stacked acoustic ejection mechanism in operative association with a single well of the well plate.

Turning to FIG. 3, in this figure the stacked acoustic ejection mechanism 30 and one of the wells 12 of a well plate 10, such as shown in FIG. 1 are in operational connection with each other. Well/reservoir 12 is placed within the coupling material 40, whereby a high coupling ratio is achieved between the ring transducers 32*a*–32*n* and the fluid 50 within well 12. The controller 42 functions to pulse each of the ring transducers 32*a*–32*n* in a phased sequence to cause a drop 52 to be ejected from a surface 54 of fluid 50. Drop 52 is then directed to a substrate 56 which may be any of a number of substrates, including another well plate.

More particular attention is now provided to the operation of controller 42 in its phase activation of ring transducers 32*a*–32*n*. Particularly, to emit a drop from surface 54, sufficient energy is imparted at a point at the surface 54 at substantially the same time to disturb the surface and emit drop 52. Therefore, the phasing sequence is designed to provide a convergence of a plurality of acoustic waves generated by the individual transducers 32*a*–32*n*.

In operation, controller 42 pulses or otherwise activates ring transducer 32*a* (at time=1) to generate acoustic wave 60*a* directed to the surface 54. The controller 42 will then activate or pulse ring transducer 32*b* (at time 1+Δ delay). Pulsing of ring transducer 32*b* generates acoustic wave 60*b* directed to surface 54. Similarly, ring transducer 32*c* is then pulsed by controller 42 (at time 1+Δ 2). This results in the generation of yet a further acoustic wave 60*c* directed to surface 54. The phasing operation and pulsing is continued for other ring transducers below the surface 54. The coupling material 40 assists in passing a substantial portion of the acoustic wave through side walls 18 of the well 12 into fluid 50. The frequencies and phase relationships applied to each of the ring transducers 32*a*–32*n* may vary from each other, as appropriate to cause the generated acoustic waves to reach the selected destination at the appropriate time. Controller 42 is capable of generating its pulses by any known pulse generating scheme.

From the preceding description, it is seen that the disclosed concepts illustrate an acoustic drop ejection system which has a controllable, variable focal length/variable F-number design. By providing this controllable variable focal length/variable F-number design, the system may effectively address changing liquid levels in reservoirs, through adjustment of system operating parameters. These adjustments result in acoustically generated signals which will come to focus at different levels in the reservoirs.

Figure 4:
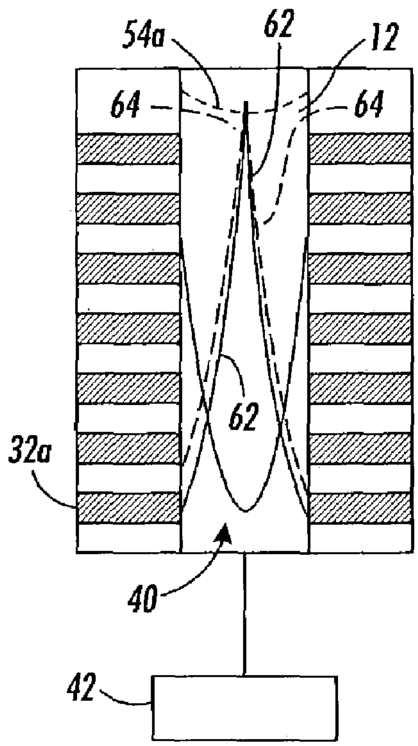
FIG. 4 illustrates a system and process used to determine the fluid surface height of fluid in the well.

Turning to FIG. 4, it is understood that knowing the height of the liquid 50 within well 12 assists in determining the required values of particular system operating parameters such as the frequency, time delay and selective operation of the ring transducers 32*a*–32*n*. For example, as fluid drops are emitted from the fluid, the surface level may drop from a first level 54 of FIG. 3 to fluid level 54*a*. Therefore, it is desirable to provide a liquid height detection mechanism and procedure. Then, when the height of the liquid is determined, this information is used by the controller 42 to calibrate the output of the ring piezo transducers.

One procedure for determining the fluid height is a pulse echo technique. Specifically, the controller 42 pulses the bottom ring transducer 32*a* generating a pulse echo acoustic wave 62. The generated wave 62 travels to the surface of fluid level 54*a* and is deflected at the surface interface. The deflected wave 64 then propagates back down to ring transducer 32*a*. The returned acoustic wave is then sensed by the transducer 32*a,* now operating as a receiver. Particularly, it is known transducers can operate both as transmitters and receivers. Therefore, in this operation when controller 42 issues an activation pulse, transducer 32*a* operates to transmit acoustic wave 62 which reflects off the surface of the fluid level 54*a*, and then a portion thereof reflects back to the transducer 32*a*, which is at this point operating as a receiver. Controller 42 determines the time from transmission to reception, and is therefore able to calculate the fluid height. Again, using this information, controller 42 calibrates its phased operation, taking into account the liquid level, as well as the effects of the side walls and other physical parameters.

An alternative level checking technique to determine the fluid level is accomplished by sequentially pulsing the plurality of ring transducers 32*a*–32*n*, to detect the strongest of the waves. If a transducer is pulsed and there is no reflective wave, then it is know the transducer would be above the fluid level. Subsequent lower transducers can be pulsed in this way until a reflective wave is detected and the fluid level would be known to be above the transducers which had a reflective wave and below those that did not have a reflective wave. Of course, still other techniques for measuring fluid level may be undertaken, including use of separate components such as a visual inspection via a laser arrangement or other known such techniques.

Figure 5:
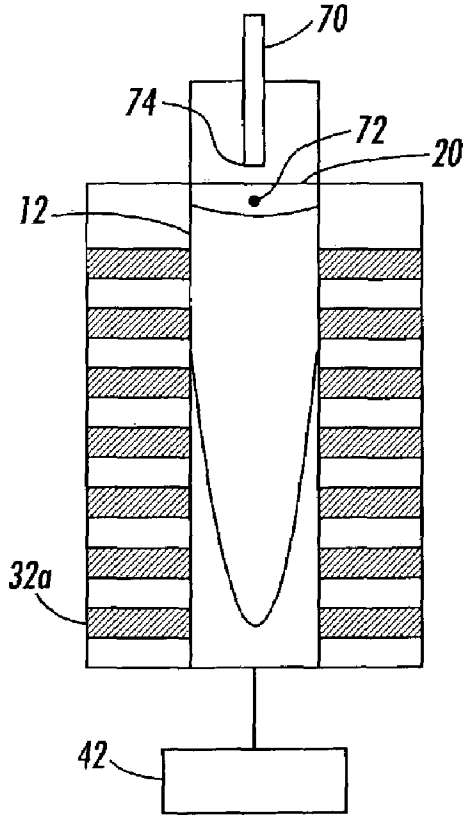
FIG. 5 depicts the stacked acoustic ejection mechanism ejecting a fluid drop from the well, being collected by a drop collection mechanism.

Turning to FIG. 5, one embodiment of the present application is used for the transferring of the fluid from the well 12 to a drop collection mechanism 70, which is then used to move the drop to a third location, such as a separate well plate. In FIG. 5, drop collection mechanism 70 is placed over the upper aperture 20 of well 12. By operation of controller 42, drop 72 is emitted by acoustic energy and is directed to a receiving tip 74 of drop collection mechanism 70. Collection mechanism 70 is designed to pull the drop 72 into collection mechanism 70 by capillary action, so it does not fall back down into the well 12 and contaminate the fluid in the well.

Figure 6:
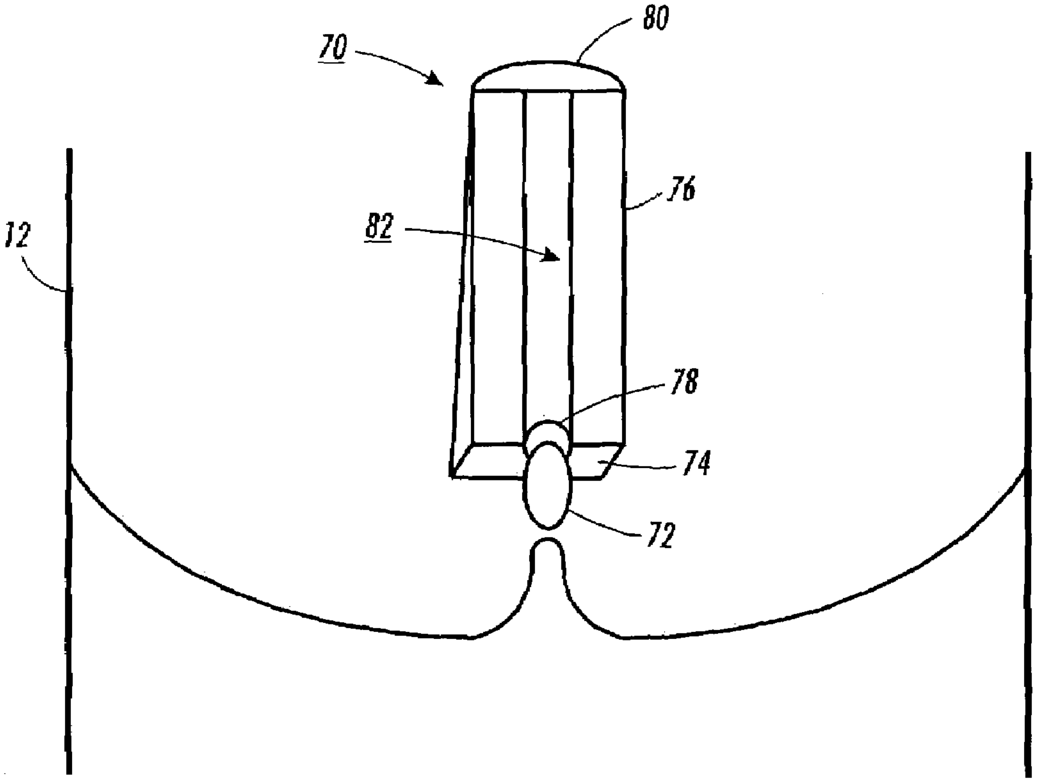
FIG. 6 provides additional detail of the fluid drop collection mechanism of FIG. 5.

Turning to FIG. 6, a more detailed view of the drop collection mechanism 70 is illustrated as having side walls 76 extending substantially perpendicular to the surface of fluid in well 12, the front first surface or receiving tip 74 in which is defined an opening 78, and a second end 80. The front surface 74 is designed with a hydrophobic surface material such as a silicone rubber, or other high surface tension material. Opening 78 provides access to an interior area 82 having hydrophilic interior surfaces such as copper or other low surface tension material. As an alternative, the interior area 82 may be designed with a texture that draws the fluid drops into the interior. This texture may be a rough surface used to grab the droplets and pull the droplets into the interior area 82. Since many of the subsequent reactions in the biofluid, combinatorial chemistry areas may require highly diluted solutions, the interior area (capillary) can be partially filled with dilutant prior to the fluid drop being obtained.

When the captured drop is to then be emitted, such as a separate well plate, an active drop expulsion device such as a burst of air generated by an energy source which is part of back end 80 may be used.

Figure 7:
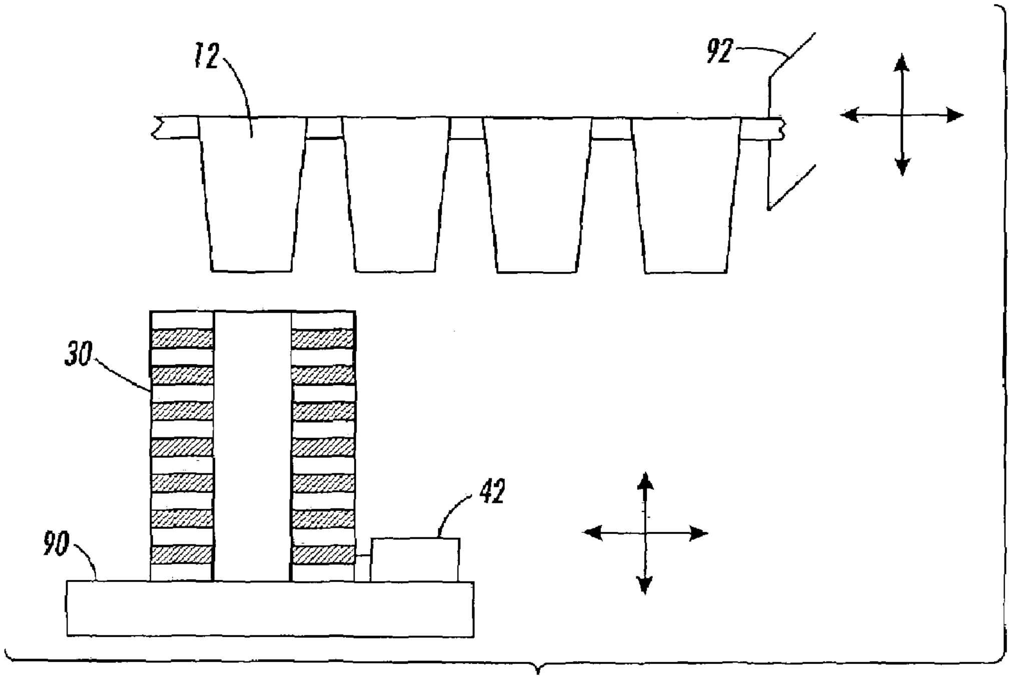
FIG. 7 sets forth an embodiment wherein the acoustic stacked ejection mechanism is a single acoustic ejection mechanism moved among a plurality of reservoirs of a well plate.

Turning to FIG. 7, in one embodiment, the stacked acoustic ejection mechanism 30 may be placed on a movable carrier 90, which operates to locate stacked acoustic ejection mechanism 30 in alignment with one of wells 12 and then move mechanism 30 into operational engagement with the selected well. In this manner, a single ejector mechanism 30 (or a number smaller than the amount of reservoirs) may be used to eject droplets from an associated well plate.

With further attention to FIG. 7, ejection mechanism 30 is maintained in a stationary state, and the well plate is moved via a moving mechanism 92 over the stationary acoustic ejection mechanism 30 and then moved into operational engagement.

Figure 8:
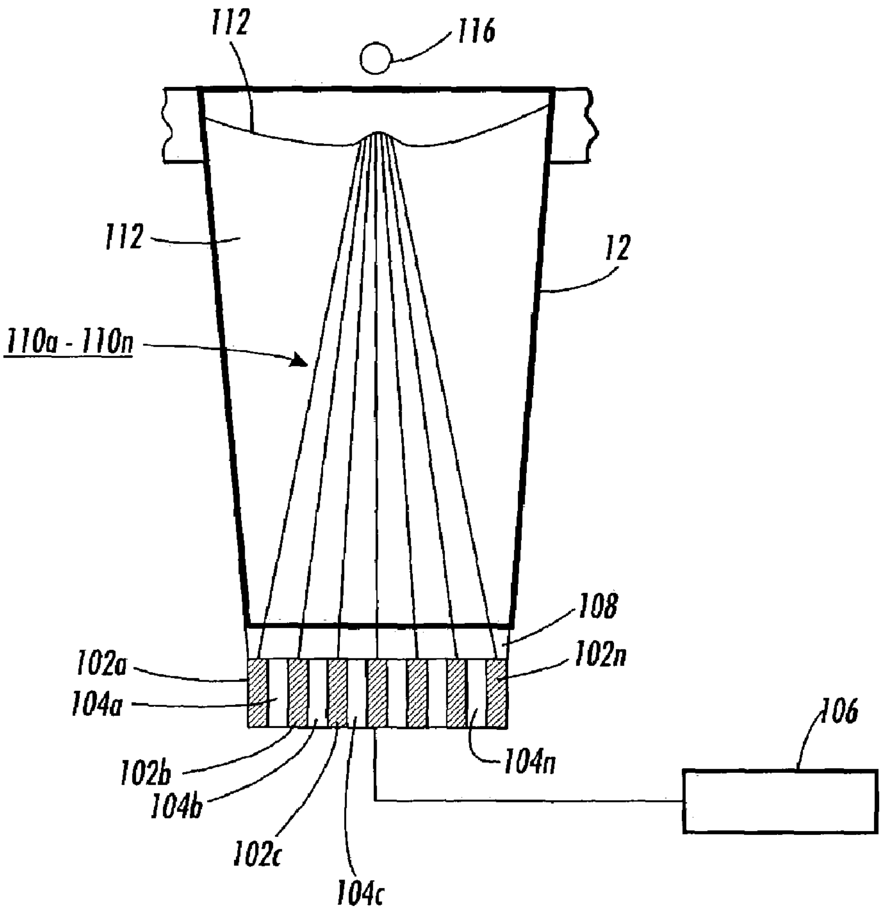
FIG. 8 illustrates a side view of a planar acoustic ejection mechanism.

Turning to another embodiment of the present application, FIG. 8 illustrates a side view of a planar acoustic ejection mechanism 100 having ring transducers 102*a*–102*n* located in a plane in an alternating sequence with spacing components 104*a*–104*n*. A controller 106 controls operation of transducers 102*a*–102*n*. An acoustic coupling component 108 is located on a top surface of the planar acoustic ejection mechanism 100 for coupling generated acoustic waves into the interior of a well 12. Alternatively, the acoustic coupling material may be part of the well.

In a similar manner as described in connection with the embodiment of the stacked acoustic ejection mechanism 30, the controller 106 generates activation signals which are transmitted to the individual ring transducers 102*a*–102*n*. This activates acoustic waves such as 110*a*–110*n* generated to reach an upper surface 112 of fluid 114 at substantially the same location and same time with sufficient energy to disturb the surface and generate a droplet 116. It is to be appreciated that control of ring transducers 102*a*–102*n* will, similar to the embodiment of FIGS. 2–3, provide for a system with a controllable, variable focal length or F-number.

Figure 9:
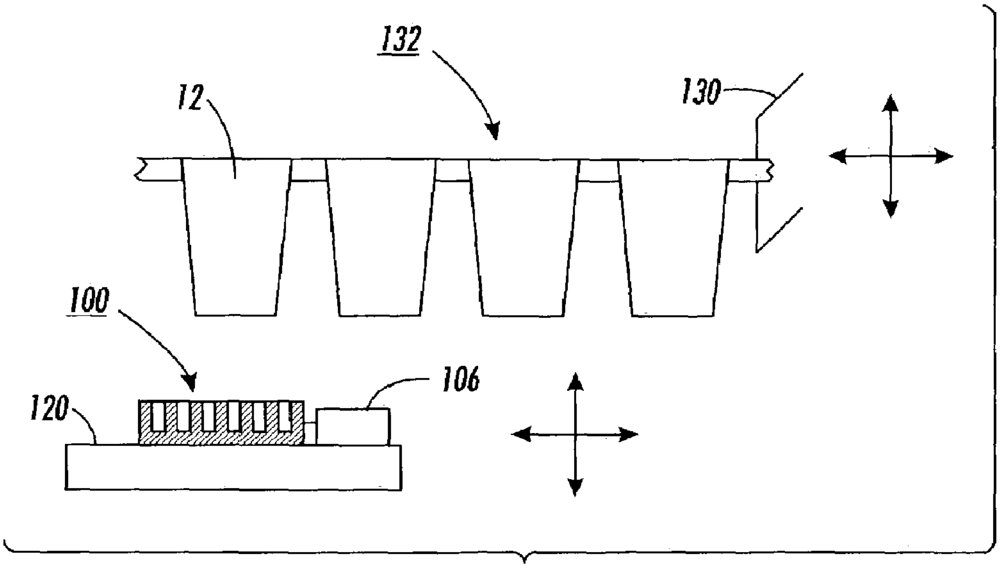
FIG. 9 illustrates a side view of a planar acoustic ejection mechanism located on a movable transport for movement among a plurality of wells.

Similar to the embodiments for the stacked acoustic ejection mechanism 30 of FIGS. 7 and 8, in FIG. 9 the planar acoustic ejection mechanism 100 is located on a movable transport 120 which moves the planar acoustic ejection mechanism 100 to individual wells 12, and then after aligning at the appropriate location, moves into operational connection with a selected well.

In an alternative embodiment in FIG. 9, ejection mechanism 100 is maintained in a stationary planar acoustic ejection mechanism, and a movable transport 130 for the well plate 132.

Figure 10:
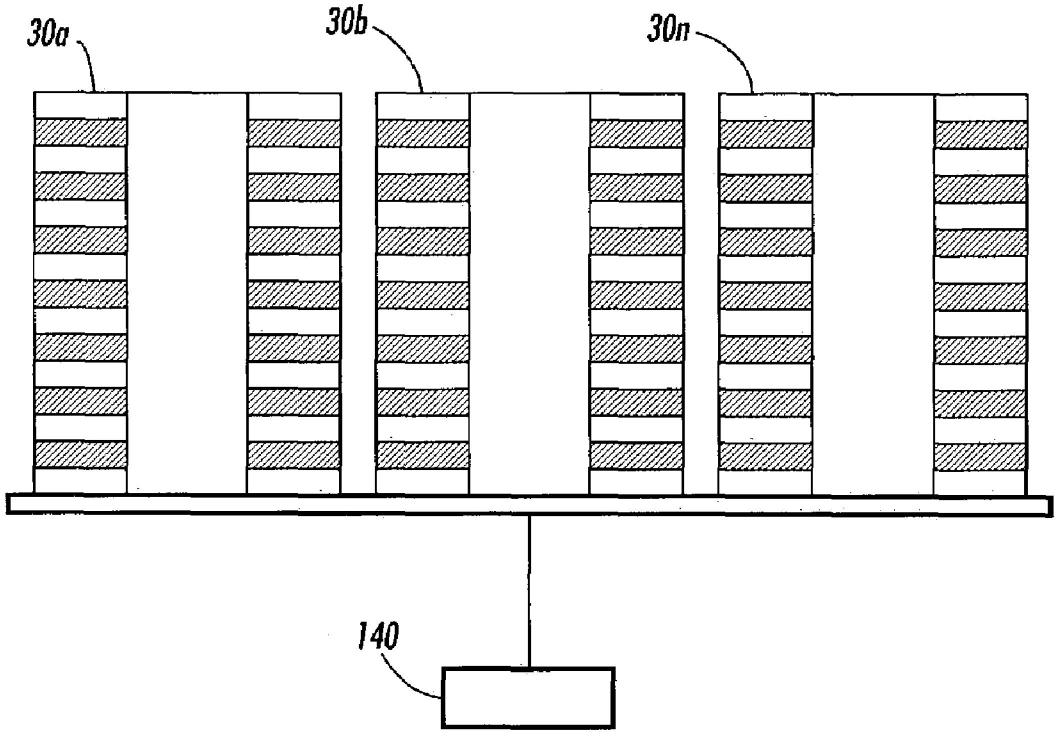
FIG. 10 sets forth a plurality of stacked acoustic ejection mechanisms being movable among a plurality of reservoirs of a well plate.
Figure 11:
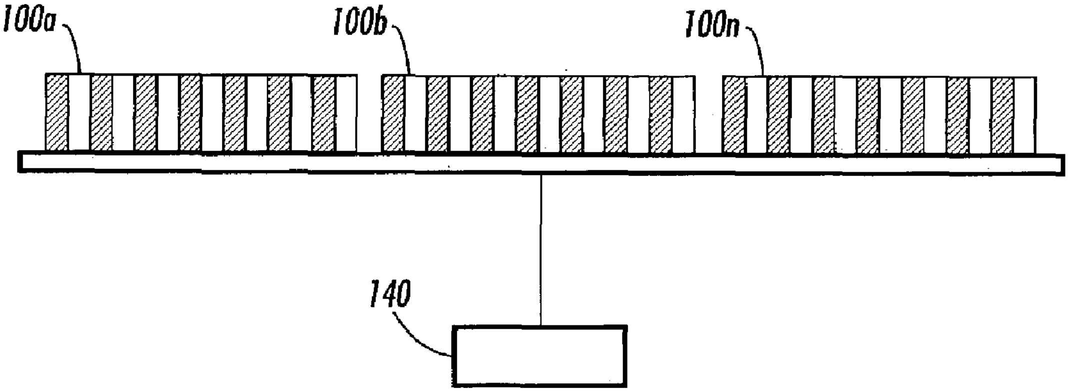
FIG. 11 depicts a plurality of planar acoustic ejection mechanisms being movable among a plurality of reservoirs of a well plate.

In another embodiment, illustrated by FIG. 10, a plurality of stacked acoustic ejection mechanisms 30*a*–30*n* are formed and driven co-operatively by a controller configuration 140 which may be a single controller such as in FIG. 3 or multiple controllers acting together. The stacked acoustic ejection mechanisms are spaced to permit engagement with a plurality of the reservoirs or wells of the well plate. In this design, all or a subset of the reservoirs or wells may be engaged at a single time. FIG. 11 depicts a similar embodiment such as FIG. 10, but in relationship with a plurality of planar acoustic ejection mechanisms 100*a*–100*n*.

Use of the foregoing embodiments provide mechanisms which permit the pulling out of small amounts of the fluid from well plates or other deep designed reservoirs or wells where the ratio of reservoir or well height to aperture (i.e., opening) is 1:1, and greater and highly variable over the course of using up the fluid. For example, described mechanisms are effective where the height to aperture size is greater than 1:1, e.g., 2:1 or more. As the height of the reservoir or well increases, additional ring transducers may be added. By this design, a drop size of 100 picoliters and a drop diameter of 57.5 $\mu$m may be achieved, where the velocity in water, when that is used as a coupling fluid, is 1500 m/s at approximately 52 Mhz which is a reasonable frequency range for this type of system. For these results, a velocity in the transducers is approximately 4500 m/s, and there is approximately 86 $\mu$m of layer separation between the transducers.

It is to be understood that while the invention has been described in conjunction with the specific embodiments thereof, the foregoing description is intended to illustrate and not to limit the scope of the invention. Other aspects, advantages and modifications will be apparent to those skilled in the art to which the invention pertains.

What is claimed is:

1. A drop transfer system comprising:

a plurality of acoustic transducers which generate acoustic waves;

a plurality of spacing components located between at least some of the acoustic transducers wherein the acoustic waves generated by the acoustic transducers are at least partially physically spaces from each other and the plurality of acoustic transducers and the plurality of spacing elements are configured in a stacked alternating sequence, which forms an interior area sized to receive a reservoir; and a controller in operative connection with the acoustic transducers, and configured to activate the acoustic transducers in a phased relationship with each other, wherein the acoustic transducers are positioned in relationship to each other and are operated in the phased relationship to have at least some of the acoustic waves converge at a selected location and at a selected time.

2. The system according to claim 1, wherein the interior area includes an acoustic coupling material.

3. The system according to claim 1, wherein the controller is designed to alter the phase relationship of the acoustic transducers.

4. The system according to claim 1, further including a reservoir having a bottom, side walls, and a top side aperture, the reservoir located within the interior area and holding an amount of fluid.

5. The system according to claim 4, wherein the fluid is a biofluid.

6. The system according to claim 4, wherein the point where at least some of the acoustic waves converge is at a surface of the fluid, resulting in a drop of the fluid being emitted from the reservoir.

7. The system according to claim 1, further including:

a plurality of sets of the acoustic transducers; and a plurality of sets of the spacing elements, each of the plurality of sets of the spacing elements located between at least some of the acoustic transducers.

8. The system according to claim 1, further including a reservoir having a bottom, side walls, and a top side aperture, the reservoir located in operational association with the plurality of acoustic transducers, wherein operation of the acoustic transducers result in the emitting of fluid drops from the reservoir.

9. The system according to claim 8, further including:

a drop collection mechanism having side walls, a first end perpendicular to the side walls, a second end perpendicular to the side walls and distant from the first end, the first end having a hydrophobic surface in which is defined an opening, and a hydrophilic, interior section extending from the opening and defined by the side walls.

10. The system according to claim 1, wherein the acoustic transducer is configured to operate as a transmitter and a receiver.

11. The system according to claim 1, further including a reservoir, at least one of the plurality of transducers and spacers and the reservoir being movable.

12. The system according to claim 1, wherein the controller is configured to activate the acoustic transducers to generate acoustic wave signals and the signals are focused at variable levels in the reservoir thereby creating variable effective focal lengths.

* * * * *